Patented June 28, 1927.

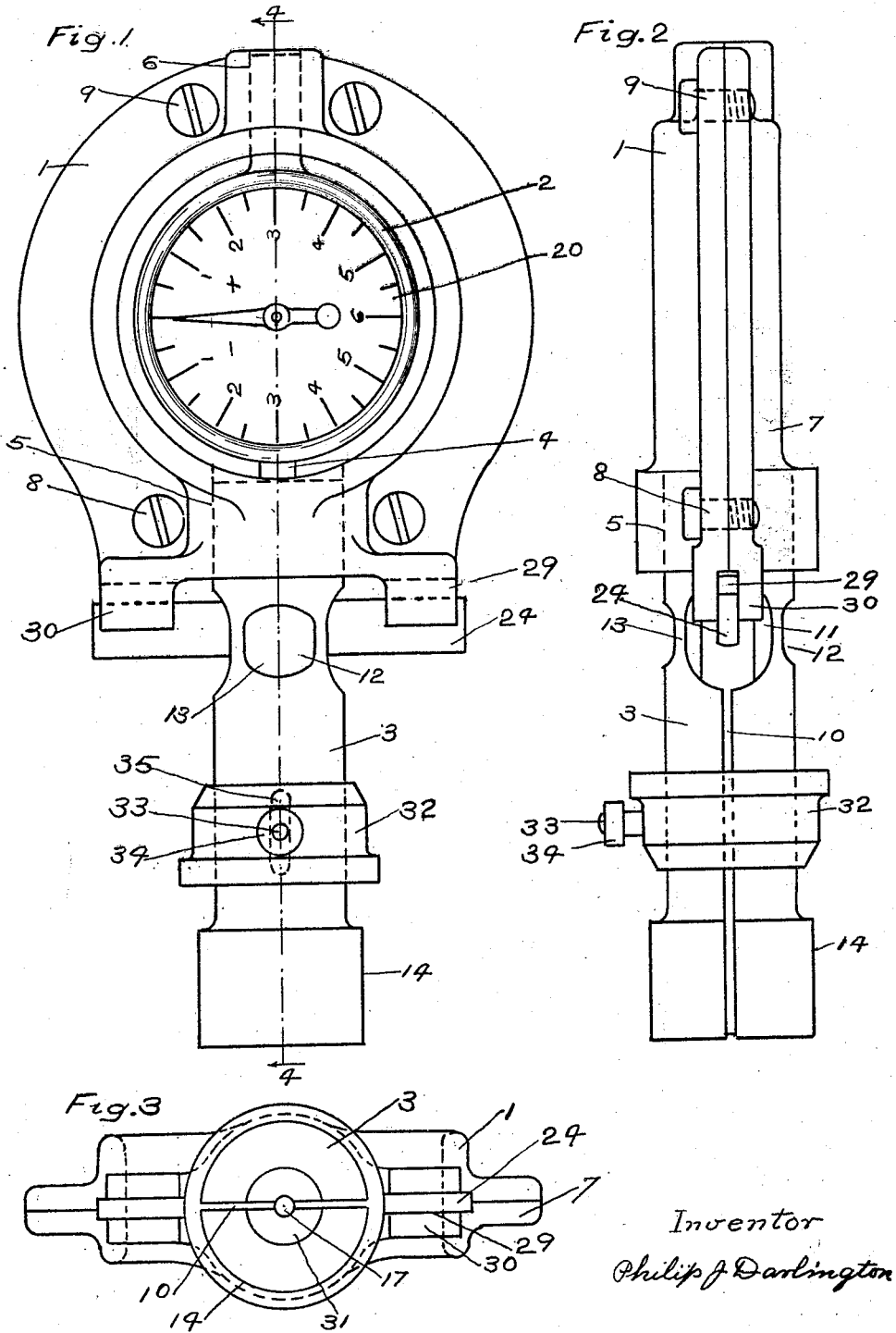

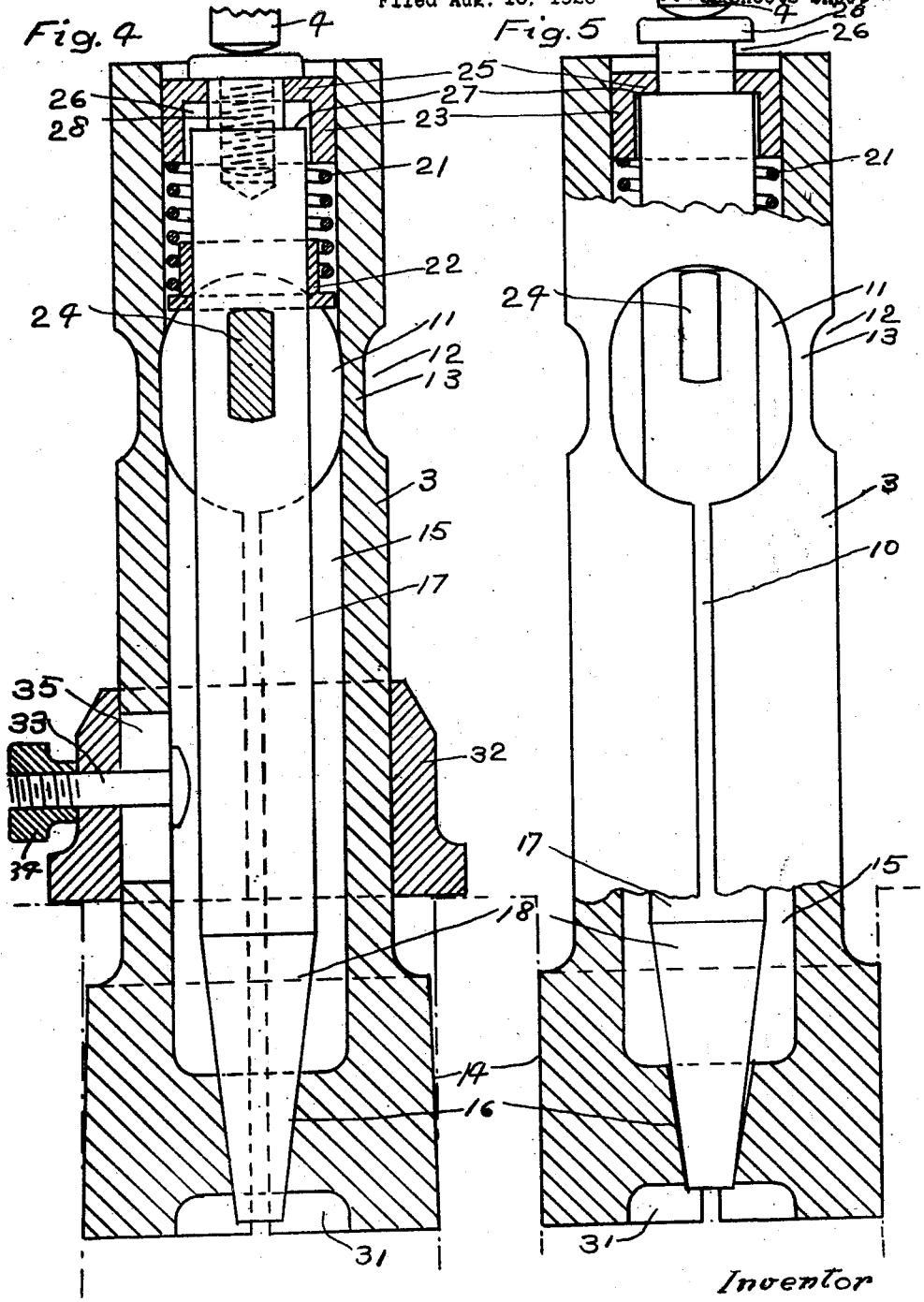

1,633,807

UNITED STATES PATENT OFFICE.

PHILIP J. DARLINGTON, OF BROOKLINE, MASSACHUSETTS.

INTERNAL MICROMETER CALIPER.

Application filed August 16, 1926. Serial No. 129,394.

This invention relates to internal micrometer calipers and especially to those of the comparator type, in which the caliper is set to read zero in a reference standard of known diameter, and is then used to measure small differences therefrom in the diameters of holes or bores of machine parts in process of production or inspection.

The object of the present invention is to provide an instrument of this character which is relatively cheap to manufacture and which has increased accuracy, speed of operation and adaptability to different diameters and depths over those of similar character which are in common use.

In the accompanying drawings Fig. 1 shows a plan of an instrument that embodies the invention;

Fig. 2 shows a side elevation of the same but with the centering collar reversed;

Fig. 3 shows an end elevation;

Fig. 4 shows, on enlarged scale, a longitudinal section of the measuring plug on the plane indicated by the dot and dash line 4—4, on Fig. 1;

Fig. 5 is similar to Fig. 4 but without the centering collar and with the plunger drawn back to position for measuring the smallest diameter.

The device illustrated comprises an annular frame 1, a dial indicator 2 adjustably supported inside the frame, and an expansible split plug 3 removably and adjustably supported by the frame, extending radially therefrom and in line with the measuring spindle 4 of the indicator.

The plug 3 and the indicator 2 are supported by cylindrical bores 5 and 6 respectively, formed between the frame 1 and an annular clamping cap member 7. The frame and cap are fastened together by screws 8 and 9 which when tightened secure the plug and indicator respectively in their adjusted positions.

The plug 3 is formed with a longitudinal slot 10 extending from its forward end to a transverse opening 11. Opposite this transverse opening the walls of the plug are thinned preferably by removing portions, as at 12, so as to render the connecting sections 13 flexible, whereby the forwardly extending or measuring end of the plug may be set so as to normally contract but may be easily expanded. The forward end of the plug has measuring surfaces 14 which are preferably so shaped that when contracted to the smallest diameter to be measured the measuring end of the plug will be circular in cross-section.

The plug 3 has a longitudinal bore 15 extending from its rear end and terminating at its front end in a tapered bore 16 which is preferably of true conical form when the surfaces 14 are spread to the largest diameter to be measured.

An axially-adjustable cylindrical plunger 17 has a conical forward end 18 formed to co-operate with the tapered bore 16 in forcing apart the contact surfaces 14. The plunger 17 contacts with the measuring spindle 4 and operates the indicator 2, which has a dial 20 graduated in units of the diametrical displacement of the measuring surfaces 14.

The plunger 17 is normally pressed forward by a spring 21, acting between a collar 22, carried by the plunger, and a rear bearing bush 23 which is adjustably pressed into, and frictionally held in, the bore 15 on the plug.

A cross bar 24, carried by the plunger 17, serves to support the collar 22 axially on the plunger and extends outwardly through the opening 11 in the plug to convenient position to be pressed rearwardly by the finger of the hand holding the caliper.

An internal flange 25 of the bush 23 extends into an annular space 26 formed at the rear end of the plunger 17 between a shoulder 27 and the head of a screw 28 that is turned into the end of the plunger, whereby the range of movement of the plunger 17 is limited, while the location of the range is adjustable by moving the bush 23 in its frictional seat.

The outer ends of the cross bar 24 slide in guide grooves 29 formed in extensions 30 of the frame and cap.

The plug 3 is formed with a counterbore 31 at its forward end, of a depth greater than the maximum movement of the plunger 17 which is of such length as to never protrude beyond the plug or uncover any surface of the tapered bore 16.

A reversible centering collar 32 is adjustably secured on the plug 3 by a bolt 33 which extends through a slot 35 in the plug and is provided with a thumb nut 34. One end of the collar 32 is flanged to form an end face of a diameter larger than any bore to be measured. The other end is tapered from smaller to larger than any diameter to be measured.

In operation, a plug of suitable size is selected and clamped into the frame, the centering collar is adjusted to the depth at which the measurement is to be taken. The plunger is retracted, allowing the contact surfaces of the plug to contract. The end of the plug is inserted into the standard reference bore and the indicator is adjusted to and clamped in the position at which it reads zero. The instrument may then be applied to the opening to be measured, the measuring end of the plug being contracted, and then allowed to expand in the bore and the deviation of the diameter from that of the reference standard, if any, will be shown by the indicator.

At maximum diameter, Fig. 4, the contact surfaces are not flat on the surface of the bore being measured, while at minimum diameter, Fig. 5, the conical surface of the plunger is not flat with the surface of the taper bore. Each of these distortions alone would tend to distort the reading and cause error, but both together tend to compensate each other and produce correct proportional measurement.

I claim:

1. In a micrometer caliper having a frame, a plug with an expansible and contractible measuring end extending from said frame, said plug having a bore with a tapering section within its measuring end, a plunger longitudinally movable in the bore of the plug, said plunger having a tapering end adapted to engage the tapering section of the bore and expand the plug, means for moving the plunger longitudinally within the plug, and an indicator adjustably held by the frame and adapted to be engaged by and to indicate the position of the plunger.

2. A micrometer caliper having a frame, a plug with an expansible and contractible measuring end extending from said frame, said plug having a bore with a tapering section within its measuring end, a plunger longitudinally movable in the bore of the plug, said plunger having a tapering end adapted to engage the tapering section of the bore and expand the plug, means extending from the plunger through the plug by which the plunger may be retracted to permit the measuring end of the plug to contract, and an indicator adjustably held by the frame and adapted to be engaged by and to indicate the position of the plunger.

3. A micrometer caliper having a frame, a plug with an expansible and contractible measuring end extending from said frame, said plug having a bore with a tapering section within its measuring end, a plunger longitudinally movable in the bore of the plug, said plunger having a tapering end adapted to engage the tapering section of the bore and expand the plug, a spring arranged within the plug to normally hold the tapering end of the plunger in engagement with the tapering section of the bore of the plug, means for moving the plunger longitudinally in the plug against the thrust of the spring, and an indicator adjustably held by the frame and adapted to be engaged by and to indicate the position of the plunger.

4. A micrometer caliper having a frame, a plug with an expansible and contractible measuring end extending from said frame, said plug having a bore with a tapering section within its measuring end, a plunger longitudinally movable in the bore of the plug, said plunger having a tapering end adapted to engage the tapering section of the bore and expand the plug, a spring arranged within the plug to normally hold the tapering end of the plunger in engagement with the tapering section of the bore of the plug, means extending from the plunger through the plug by which the plunger may be retracted to permit the measuring end of the plug to contract, and an indicator adjustably held by the frame and adapted to be engaged by and to indicate the position of the plunger.

5. A plug for a micrometer caliper comprising a hollow cylindrical body having a transverse opening and externally thinned adjacent to said opening to render the walls of said body flexible at the locality of said opening and slots extending from an end of the body to said opening, the end of the slotted section of the body having external cylindrical measuring surfaces and conical interior expanding surfaces, and a plunger longitudinally movable within said body and having a conical end adapted to engage the conical walls in the interior of the flexible end of the body and spread apart said end with the exterior measuring surfaces.

6. A plug for a micrometer caliper comprising a hollow cylindrical body having a transverse opening and externally thinned adjacent to said opening to render the walls of said body flexible at the locality of said opening and slots extending from an end of the body to said opening, the end of the slotted section of the body having external cylindrical measuring surfaces and conical interior expanding surfaces, a plunger longitudinally movable within said body and having a conical end adapted to engage the conical walls in the interior of the flexible end of the body and spread apart said end with the exterior measuring surfaces, and amplifying means cooperating with said plunger for indicating the amount of spread of said measuring surfaces.

In testimony whereof I have signed my name to this specification.

PHILIP J. DARLINGTON.